United States Patent
Hwang

[11] Patent Number: 5,902,656
[45] Date of Patent: May 11, 1999

[54] DAMPERS FOR INTERNAL APPLICATIONS AND ARTICLES DAMPED THEREWITH

[75] Inventor: Shwi-Long Hwang, Eagan, Minn.

[73] Assignee: Minnesota Mining and Manufacturing Company, St. Paul, Minn.

[21] Appl. No.: 08/668,224

[22] Filed: Jun. 21, 1996

[51] Int. Cl.⁶ ................................... B29D 22/00
[52] U.S. Cl. .................... 428/36.91; 428/36.5; 428/36.8; 428/36.9; 473/316; 473/318; 473/321; 138/146; 138/112; 138/143
[58] Field of Search ................ 428/36.5, 36.8, 428/36.9, 36.91; 473/316, 318, 321; 138/146, 112, 143

[56] References Cited

U.S. PATENT DOCUMENTS

| | | | |
|---|---|---|---|
| 3,334,901 | 8/1967 | Steffes | 273/68 |
| 4,435,877 | 3/1984 | Berfield | 15/326 |
| 4,653,169 | 3/1987 | Puszakowski | 29/445 |
| 5,030,490 | 7/1991 | Bronowicki | 428/36.4 |
| 5,087,491 | 2/1992 | Barrett | 428/34.5 |
| 5,213,879 | 5/1993 | Niwa et al. | 428/213 |
| 5,294,119 | 3/1994 | Vincent | 273/80 B |
| 5,374,057 | 12/1994 | Lai | 273/73 |
| 5,418,339 | 5/1995 | Bowen | 181/230 |
| 5,507,477 | 4/1996 | Manning | 267/140.3 |
| 5,538,774 | 7/1996 | Landin et al. | 428/64.1 |
| 5,545,094 | 8/1996 | Hsu | 473/317 |
| 5,552,209 | 9/1996 | McCutcheon | 428/209 |
| 5,655,975 | 8/1997 | Nashif | 473/316 |

FOREIGN PATENT DOCUMENTS

| | | | |
|---|---|---|---|
| 2 165 333 | 4/1986 | United Kingdom | F16F 3/10 |
| 2 198 498 | 6/1988 | United Kingdom | F16F 1/36 |
| 2 259 747 | 3/1993 | United Kingdom | F16F 13/00 |

OTHER PUBLICATIONS

H. W. Lord et al., *Noise Control for Engineers*, Robert E. Krieger Publishing Company, Inc., 1987, pp. 214–227.

3M Vibration Control, 3M Engineered Foam Products, 70–0705–7553–3 TD DP–460.PRF 223, 3M 1994.

3M Vibration Control, 3M Noise and Vibration Control Systems, 70–0706–5920–9 3M 1995.

3M Vibration Control Systems, EF–300 Acoustical Absorbing/Damping foam: *Revised Preliminary Data Specifications:* Nov. 22, 1995.

*Primary Examiner*—Nam Nguyen
*Assistant Examiner*—Steven H. Ver Steeg

[57] ABSTRACT

The present invention provides a damper comprising a compressible and resilient shaft and at least one constrained layer damping section attached to the exterior of the shaft via an adhesive. The damper can be compressed and inserted into a cavity or hollow in an article to be damped whereupon it can expand and provide vibration damping properties as well as optional acoustic absorbing properties. The present invention also provides the damped article and a method of damping the article.

32 Claims, 3 Drawing Sheets

DAMPERS FOR INTERNAL APPLICATIONS AND ARTICLES DAMPED THEREWITH

FIELD OF THE INVENTION

The present invention provides a novel damper which can be positioned within the interior of an article such as a hollow tube, for example. The invention also provides articles which contain the novel dampers and a method of damping the articles.

BACKGROUND OF THE INVENTION

Articles such as pipes and tennis rackets, have been damped in the past by a variety of dampers. Examples of such dampers include the following.

U.S. Pat. No. 5,374,057 to Lai et al. describes the use of constrained layer dampers on a tennis racket frame to reduce the level of vibration transmitted from the frame to the player's hand. Two separate constrained layer dampers are applied either on the outer surface or on the inner surface of the frame and have shown improvement in reducing vibration level.

U.S. Pat. No. 5,294,119 to Vincent et al. describes particular applications of constrained layer dampers on a golf shaft. The first damper embodiment is a constrained layer damper which encircles the outside surface of a golf shaft. The second embodiment includes several constraining layers attached to the outer surface of the golf shaft by a continuous damping layer. In other words, the ring-shaped damping layer in one embodiment is used to attach the constraining layer to the golf shaft surface. The damping layer referred to in this patent is exposed to the environment on the outside of the shaft.

U.S. Pat. No. 5,087,491 to Barrett discloses a damped tube. The damped tube is essentially a three-layer structure with a damping layer between two layers of advanced fiber reinforced composite materials. The stiffness of the tube is controlled by the two composite layers. The total damping is optimized by tuning the anisotropic properties of fibers in such a way to transfer the strain into the damping layer for the purpose of generating shear strain.

U.S. Pat. No. 5,030,490 to Bronowicki et al. describes the use of ring-shaped dampers on both the inner and outer surface of a tube. The dampers are segmentedly placed along the axis of a tube. This placement of segmented dampers along tube axis could be effective when the vibration occurs along the tube axis.

U.S. Pat. No. 5,507,477 to Manning et al. discloses a tubular composite structure having multiple viscoelastic damping layers and stiff segmented constraining layers formed on the outside of a tubular layer of soft elastic material. This multilayer damping treatment is said to provide a way to improve structural damping over a wider range of temperature.

Patents for noise attenuation using acoustical absorbing materials include U.S. Pat. No. 4,435,877 to Berfield which discloses a noise muffler for a vacuum cleaner constructed of flexible open cell foam inserts and U.S. Pat. No. 5,418,339 to Bowen et al. which discloses a sound muffler for a pneumatic tool constructed of a nonwoven web of fibers coated with a binder resin.

Pieces of foam have been inserted in golf club shafts and have demonstrated improvement in structural borne sound. This demonstration occurred at the DISCON Conference in San Jose, Calif., in September of 1995.

SUMMARY OF THE INVENTION

Although the above described references describe dampers, damped articles and noise attenuators, none of them describe a damper and damped article wherein the vibration damper, which can optionally damp sound, can be so conveniently made and inserted into the article to be damped. The dampers of the present invention provide a convenient means for internally damping an article. The present invention provides a novel damper comprising:

(a) a compressible and resilient shaft, the shaft having an exterior surface and optionally an interior surface;

(b) at least one constrained layer damping section, each constrained layer damping section comprising:

(i) a backing;

(ii) a layer(s) of vibration damping material attached to one side of the backing;

wherein the Young's modulus of the backing is greater than the Young's modulus of the layer(s) of vibration damping material;

(iii) optionally a first adhesive layer, wherein the first adhesive layer serves to attach the layer(s) of vibration damping material to the backing; and (iv) optionally a second adhesive layer, wherein the second adhesive layer is coated on a side of the layer(s) of vibration damping material not attached to the backing, and (c) a third adhesive layer, wherein the third adhesive layer serves to attach the constrained layer damping section(s) to the exterior surface of the shaft via the backing of each constrained layer damping section.

The present invention allows one to easily position constrained layer damping section(s) on the damper shaft and ultimately in the interior of the article to be damped. It is much more convenient to attach the dampers to the shaft followed by attachment to the interior of the article rather than directly attempt to attach the dampers to the interior of the article to be damped where space, maneuverable room, visibility, and available light are limited.

The present invention also provides the articles damped via the damper of the invention. The article has at least one of the above described dampers of the invention attached to an inner surface(s) thereof in a manner which damps the article. Preferably the damper(s) are attached to an inner surface(s) thereof such that each constrained layer damping section is attached to an inner surface(s) of the article.

The present invention also provides a method of damping an article comprising the steps of:

(a) providing an article having an inner surface(s);

(b) compressing the damper of the invention; and (c) inserting the compressed damper into the article and allowing the damper to expand such that each constrained layer damping section of the damper is attached to an inner surface of the article.

DETAILED DESCRIPTION OF THE INVENTION

I. Constrained Layer Damping Sections

I.A. Vibration Damping Material Layer(s)

A variety of damping materials may be used in the constrained layer damping sections. The vibration damping material layer(s) may optionally have pressure sensitive adhesive properties. A vibration damping material layer may be continuous or discontinuous. A continuous vibration damping material layer may comprise one type of damping material or may comprise adjacent sections of different vibration damping materials, for example. As an illustration, adjacent sections of vibration damping materials having differing chemical compositions may be used. A discontinuous layer may comprise sections of damping material separated by non-damping material(s) or space(s) for example. In addition when at least two damping layers are present each layer may comprise damping material(s) of the same or different chemical compositions. Preferably, the backing is substantially covered with a continuous layer(s) of damping material, although the layer(s) may be discontinuous.

The vibration damping material comprises a viscoelastic material. A viscoelastic material is one that is viscous, and therefore capable of dissipating energy, yet exhibits certain elastic properties, and therefore capable of storing energy at the desired temperature and frequency range. That is, a viscoelastic material is an elastomeric material typically containing long-chain molecules that can convert mechanical energy into heat when they are deformed. Such a material typically can be deformed, e.g., stretched, by an applied load and gradually regain its original shape, e.g., contract, sometime after the load has been removed.

Suitable viscoelastic materials for use in the vibration damping materials useful in the present invention have a shear storage modulus G', i.e., measure of the energy stored during deformation, of at least about 1 psi ($6.9 \times 10^3$ Pascals) at the operating temperature and frequency (typically about $-40°$ C. to $100°$ C. and about 1 Hz to 10,000 Hz). The storage modulus of useful viscoelastic materials can be as high as 500,000 psi ($3.45 \times 10^9$ Pascals); however, typically it is about 10 to 2000 psi($6.9 \times 10^4$ to $1.4 \times 10^7$ Pascals). Particularly preferred viscoelastic materials provide the damped article with a strain energy ratio, i.e., fraction of strain energy stored in the damping material relative to the total strain energy stored in the damped article, of at least about 2%.

Suitable viscoelastic materials, at the operating temperature and frequency, for use in the vibration damping materials used in the present invention have a loss factor (measure of damping) of at least about 0.01. Preferably the loss factor is at least about 0.5, more preferably greater than about 0.5 to about 10, and most preferably about 1 to about 10, at the operating frequency and temperature experienced by the material. This loss factor represents a measure of the energy dissipation of the viscoelastic material and depends on the frequency and temperature experienced by the viscoelastic material. For example, for 3M™ISD 110 available from Minnesota Mining and Manufacturing Company (3M), a crosslinked acrylic polymer, at a frequency of 100 Hz, the loss factor at $68°$ F. ($20°$ C.) is about 1.0, while at $158°$ .F ($70°$ C.) the loss factor is about 0.7.

Useful vibration damping materials can be isotropic as well as anisotropic materials, particularly with respect to their elastic properties. As used herein, an "anisotropic material" or "nonisotropic material" is one in which the properties are dependent upon the direction of measurement. Suitable materials having viscoelastic properties include but are not limited to those selected from the group consisting of syntactic foams, urethane rubbers, silicone rubbers, nitrile rubbers, butyl rubbers, acrylic rubbers, natural rubbers, styrene-butadiene rubbers, and the like. Other useful vibration damping materials include but are not limited to those selected from the group consisting of polyesters, polyurethanes, polyamides, ethylene-vinyl acetate copolymers, polyvinyl butyral, polyvinyl butyral-polyvinyl acetate copolymers, epoxy-acrylate interpenetrating networks and the like. Thermoplastics and thermosetting resins suitable for use as vibration damping material may also be utilized in the manufacture of the dampers.

Useful vibration damping materials can also be crosslinkable to enhance their strength, high temperature integrity, and processability. Such materials are classified as thermosetting resins. When the viscoelastic material is a thermosetting resin, then prior to the manufacture of the damper, the thermosetting resin is typically in a thermoplastic state. During the manufacturing process, the thermosetting resin can be further cured and/or crosslinked typically to a solid state, although it could be a gel upon curing as long as the cured material possesses the viscoelastic properties described above. Depending upon the particular thermosetting resin employed, the thermosetting resin can include a curing agent, e.g., catalyst, which when exposed to an appropriate energy source (such as thermal energy) initiates the polymerization of the thermosetting resin.

As indicated above, the vibration damping material useful herein may be crosslinked. A crosslinked vibration damping material has a number of advantages. For example, it provides mechanical integrity at elevated temperatures and high stress levels that may be experienced during use. Preferred materials are acrylates, epoxies, silicones, and blends, copolymers, or interpenetrating networks thereof, more preferred materials are acrylates, epoxy/acrylates, and silicone/acrylates, and most preferred materials are acrylates and epoxy/acrylates. Examples of useful crosslinking agents include but are not limited to those selected from the group consisting of diacrylates, triacrylates, triazines, and the like. The vibration damping material typically further comprises about 0 to about 2 percent by weight of a crosslinking agent based upon the total weight of viscoelastic polymer, preferably about 0.04 to about 0.5 percent by weight, and most preferably about 0.1 to about 0.25 percent by weight.

In general, any suitable viscoelastic material can be used in the present invention. The choice of viscoelastic material for a particular set of conditions, e.g., temperature and frequency of vibration, etc., is within the knowledge of one of skill in the art of vibration damping. The selection of a suitable damping material can also be based on the processability of the damping material (cutting or other fabricating). It is to be understood that blends of any of the foregoing materials can also be used.

In addition to the viscoelastic material, the vibration damping material of the present invention may include an effective amount of a fibrous and/or particulate material. Herein, an "effective amount" of a fibrous and/or particulate is an amount sufficient to impart at least improvement in desirable characteristics to the viscoelastic material. Generally, the fibrous and/or particulate material is used in an amount effective to increase the strain energy ratio of a damper containing the same amount and type of viscoelastic material without the fibrous or particulate material. Typically, the amount of the fibrous material in the viscoelastic material is within a range of about 3–60 wt %, preferably about 10 to about 50 wt %, more preferably about 15 to about 45 wt %. based on the total weight of the vibration damping material. Typically, the amount of the particulate material in the viscoelastic material is within a range of about 0.5–70 wt %, preferably 1 to 45 wt %, more preferably 5 to 40 wt %, and most preferably about 5 to 30 wt %, based on the total weight of the vibration damping material.

The fibrous material can be in the form of fibrous strands or in the form of a fiber mat or web, although fibrous strands are preferred. The fibrous strands can be in the form of threads, cords, yarns, rovings, filaments, etc., as long as the viscoelastic can wet the surface of the material. They can be dispersed randomly or uniformly in a specified order. Examples of useful fibrous materials include metallic fibrous materials, such as aluminum oxide, magnesium, or steel fibers, nonmetallic fibrous materials, such as fiberglass, natural organic fibrous materials such as wool, silk, cotton, and cellulose and synthetic organic fibrous materials such as polyvinyl alcohol, nylon, polyester, rayon, polyamide, acrylic, polyolefin, aramid, and phenol.

The particulate material useful in the invention can be in the form of nodules, bubbles, beads, flakes, or powder, as long as the viscoelastic material can wet the surface of the particulate. The particulate material can vary in size, but should not typically be greater than the thickness of the damping material layer.

Examples of useful particulate materials include coated or uncoated glass and ceramic bubbles or beads such as thermally conductive bubbles, powders such as aluminum oxide powder and aluminum nitride powder, silica, metal flakes such as copper flakes, cured epoxy nodules, and the like.

In addition to fibers and particulate material, the vibration damping material of the present invention can include additives such as fillers (e.g. talc, etc.), colorants, toughening agents, fire retardants, antioxidants, antistatic agents, and the like. Sufficient amounts of each of these materials can be used to produce the desired result.

Combinations of fibrous material and particulate material would also be useful and would be used in the range of about 0.5 to about 70 weight percent based on the total weight of the vibration damping material.

The thickness of the vibration damping material layer(s) can vary. The thickness of the layer is dependent upon a number of factors such as the type of vibration damping material selected and the anticipated end use of the damper of the invention. Typically, the total thickness of the layer(s) ranges from about 0.01 to about 3 mm, preferably about 0.05 to about 1 mm, and most preferably about 0.1 to about 0.25 mm.

Typically the total thickness of the vibration damping material layer(s) is less than the thickness of the backing for each constrained layer damping section.

I. B. Backing

Any backing material which is typically used in constrained layer dampers can be used in the constrained layer damping sections. Examples of useful backing materials include but are not limited to those selected from the group consisting of paper, metals, polymeric materials, fiber-reinforced polymeric materials, and combinations thereof The backing may, for example, be a laminate of multiple layers. Useful polymeric materials include but are not limited to those selected from the group consisting of polystyrene, polyester, polyvinyl chloride, epoxy resin, polyurethane, polycarbonate, polyimide, polyethylene, and polypropylene. Preferably the backing has a Young's Modulus of at least about $1\times10^8$ Pascals.

As indicated previously the backing should have a Young's Modulus greater than that of the vibration damping material layer(s) for each constrained layer damping section. Preferably, the backing has a Young's Modulus of at least about 10 times greater than that of the vibration damping material layer(s), more preferably at least about 100 times greater, most preferably at least about 1000 times greater. For optimal damping, the backing should have a stiffness approximately equal to the stiffness of the article being damped. For some uses, the thickness of the backing will need to be limited due to size and/or weight limitations necessitated by the article to be damped or the location where the article is to be used. In general, the backing stiffness is a function of the thickness of the backing. For a given backing material, the bending stiffness increases as the thickness of the backing increases. Thus, the desired stiffness of the backing can be varied by adjusting the thickness depending on the modulus of the backing. The backing typically has a thickness of greater than about 0.0005 inch (0.013 mm), preferably greater than about 0.001 inch (0.025 mm), and most preferably greater than about 0.002 inch (0.051 mm). The backing may further comprise an additive such as these selected from the group consisting of fire retardants, colorants, antistatic agents, etc.

I.C. Features of the Constrained Layer Damping Sections

The constrained layer damping sections (the backing layer, vibration damping material layer, etc.) of the damper may be flat or curved, for example. Typically, they are of a shape such that they conform to the shaft to which they are attached. Preferably the dimensions and positions of the constrained layer damping section(s) are such that the entire length of the damper is capable of being compressed such that its diameter decreases along its length. Preferably, each constrained layer damping section has a length which is about 20 to about 100 percent, more preferably about 50 to about 100 percent, most preferably about 75 to about 100 percent of the length of the shaft.

Preferably the constrained layer damping sections have shapes selected from the group consisting of squares, rectangles, and tapered rectangles. Preferably the constrained layer damping sections are symmetrically positioned about the shaft. Preferably the constrained layer damping sections are equidistantly positioned about the shaft.

Preferably each constrained layer damping section is independently positioned along or parallel to a shortest line segment connecting a point on one end of the shaft to a point on an opposite end of the shaft at the same degree point on the circumference of the shaft when the shaft is viewed in cross-section when centrally positioned on an x-y grid, wherein each point on the shaft is capable as being identified as being on a degree point of 0 to 360 degrees. (See FIGS. 1, 1A and 2)

I.D. Constrained Layer Damping Section Optional Components

As indicated previously the constrained layer damping sections each comprise a vibration damping material layer(s) attached to one side of a backing in addition to optional first and second adhesive layers. The first and second adhesive layers are typically pressure sensitive adhesives. The damper may optionally further comprise, in addition to or in place of the first and second adhesive layers, a primer layer to improve adhesion between the backing and the vibration damping material layer when, for example, a first adhesive layer is not used to adhere the backing to the vibration damping material layer. Heat and/or pressure and/or adhesive may be used to bond the layers of the constrained layer damping sections together, for example.

II. Adhesive

As previously mentioned, the constrained layer damping sections are attached via a layer of adhesive (identified as the third adhesive layer herein), typically a pressure sensitive adhesive, to the exterior of the shaft. One skilled in the art would be able to select suitable adhesives for such a purpose. A representative example of a suitable adhesive would be a high-modulus adhesive such as an acrylic adhesive or epoxy adhesive. The shaft may have a pressure sensitive adhesive coated on the outer surface thereof. Thus, the constrained layer damping sections can be applied directly on the shaft. Alternatively, the adhesive (such as an adhesive transfer tape) may be applied to the backing which is then applied to the shaft.

However, it is preferable that the surface of the shaft other than the constrained layer damping sections not have exposed adhesive coatings as this could render insertion of the damper into an article more difficult. A non-adhesive layer such as a polyester film may optionally be applied over adhesive coated surfaces of the shaft other than the constrained layer damping sections in order to avoid such difficulties.

III. Resilient Compressible Shaft

The shaft is both compressible and resilient so that it can be easily inserted into small tight spaces and once inserted, it can hold the damping sections in place. Examples of suitable shaft materials include but are not limited to those selected from the group consisting of foams, rubbers, (spring) metals, and combinations thereof. The shaft can be of any suitable shape. Suitable cross-sectional shapes include but are not limited to those selected from the group consisting of star shaped, gear shaped, circular, rectangular, elliptical, and triangular shapes. The diameter of the shaft can be constant or vary along its length such as a tapered shaft. The shaft may optionally be hollow. For example, the shaft may have a hole that extends throughout its length. The shaft may optionally have indentations and/or projections. These indentations and/or projections may optionally extend the length of the shaft. The constrained layer damping sections may be attached to a projection, to an indentation, or to an area of the shaft free of projections or indentations. The constrained layer damping sections however should be attached to the shaft in a manner that allows them to contact the surface(s) of the article in which the damper is inserted.

The shaft may optionally comprise an "acoustical absorbing material". The term "acoustical absorbing material" as used herein refers to a material which is capable of absorbing or attenuating airborne sound waves. Typical acoustical absorbing materials are porous and relatively light weight with a density ranging from about 0.5 to 20 lb./ft$^3$ (8 to 350 kg/m$^3$). Acoustic absorbing materials are also discussed in a reference entitled "Noise Control for Engineers", by H. W. Lord, W. S. Gatley, and H. A. Evensen, Robert E. Krieger Publishing Company, Inc. 1987, pages 214–227, incorporated by reference herein.

The ratio of the thickness of the compressible and resilient shaft to the thickness of a constrained layer damping section can vary. Typically the ratio of the thickness of the shaft to the thickness of a constrained layer damping section ranges from about 1000 to about 1, preferably about 100 to about 1, and most preferably about 10 to about 1. The length of each constrained layer damper to the length of the compressible and resilient shaft can vary. Typically the length of each damping section ranges from about 1 to about 100 percent of the length of the shaft, preferably about 50 to about 100 percent of the length of the shaft, and most preferably about 75 to about 100 percent of the length of the shaft.

Preferably the shaft has 1 to 50 constrained layer damping sections, more preferably 2 to 10, attached thereto.

Damped Articles of the Invention

The articles to be damped via the damper(s) of the invention may or may not be hollow. However, it must have a cavity of suitable dimensions into which one or more dampers can be inserted. Preferably the article is hollow to allow for easier insertion of the damper. The damper of the invention is typically inserted into an article to be damped by the following procedure. A rod (such as a steel rod for example) or other tool can be used to help push the damper into the article to be damped. Preferably the damper is of such a construction that it can be compressed along its entire length either by hand or by means of a tool and then inserted into the article to be damped. Preferably the shaft of the damper is hollow in order to increase the ease with which the damper may be inserted into the article to be damped. Another potential insertion method would involve tying or bundling the damper to decrease its diameter, inserting the damper into the article to be damped, and cutting or loosening the ties to allow the damper to expand such that the constrained layer damping sections contact interior surface (s) of the article.

It is foreseen that a multipronged tool that could be used to compress the damper such that its diameter is decreased such that the damper can easily be inserted into the article to be damped followed by release of the tool such that the damper can conform to the shape of the article. It is foreseen that the prongs could be of about the same length as the damper or longer and that the tool could compress the damper along its entire length.

A variety of articles can be damped with the dampers of the invention. Examples of articles that can be so damped include but are not limited to those selected from the group consisting of shafts, tubes, conduits, pipes, poles, posts, and columns. Examples of specific articles include but are not limited to those selected from the group consisting of drive shafts, golf club shafts, light poles, basketball backboard poles, ball bats, structural columns, robot arms, and air duct lines.

Preferably the damper of the invention fits snugly within the article which it damps, such that the damper conforms to the hollow or cavity in which it is inserted. The shafts used according to the invention are compressible and resilient shafts. The shaft thus springs back to its original shape once it is no longer being compressed.

The present invention will be better understood by referring to the following figures.

Figures 1, 1A:
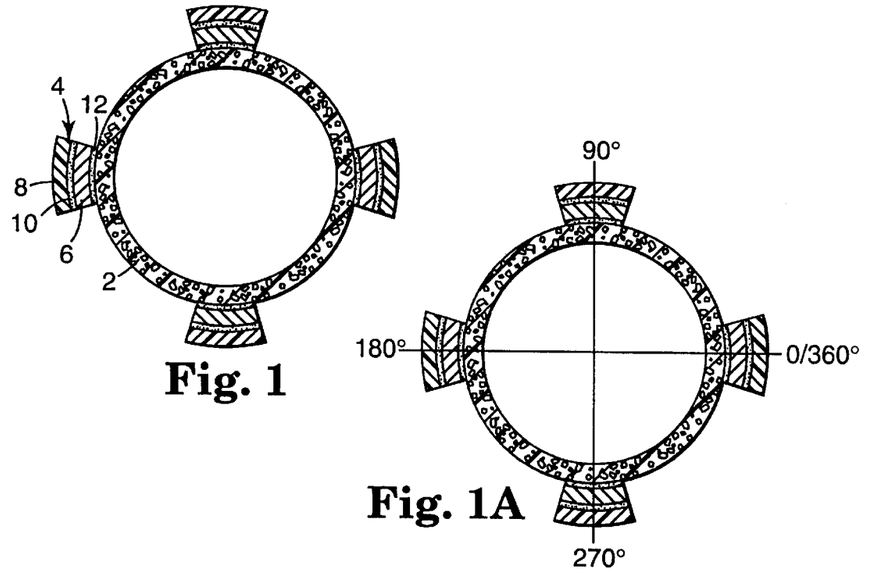
FIG. 1 illustrates a cross-sectional view of one embodiment of the damper of the invention.
Fig. 1A illustrates a cross-sectional view of the damper of FIG. 1 on an x-y grid.

FIG. 1 illustrates a cross-sectional view of one embodiment of the damper of the invention. The damper has a hollow shaft 2 and four constrained layer damping sections 4 attached to the exterior surface of the shaft 2. Each constrained layer damping section 4 comprises a backing layer 6 and a vibration damping material layer which has pressure sensitive adhesive properties 8 which is adhered to the backing layer 6 via an adhesive 10. The adhesive 10 is actually optional in this situation due to the pressure sensitive adhesive properties of the vibration damping material layer 8. The backing layer 6 of each constrained layer damping section 4 is adhered to the shaft 2 via an adhesive layer 12.

Fig. 1A illustrates a cross-sectional view of the damper of FIG. 1 on a perpendicular x-y grid. As mentioned previously, preferably each constrained layer damping section is independently positioned along or parallel to a shortest line segment connecting a point on one end of the shaft to a point on an opposite end of the shaft at the same degree point on the circumference of the shaft when the shaft is viewed in cross-section when centrally positioned on an x-y grid, wherein each point on the shaft is capable as being identified as being on a degree point of 0 to 360 degrees.

Figures 2, 3:
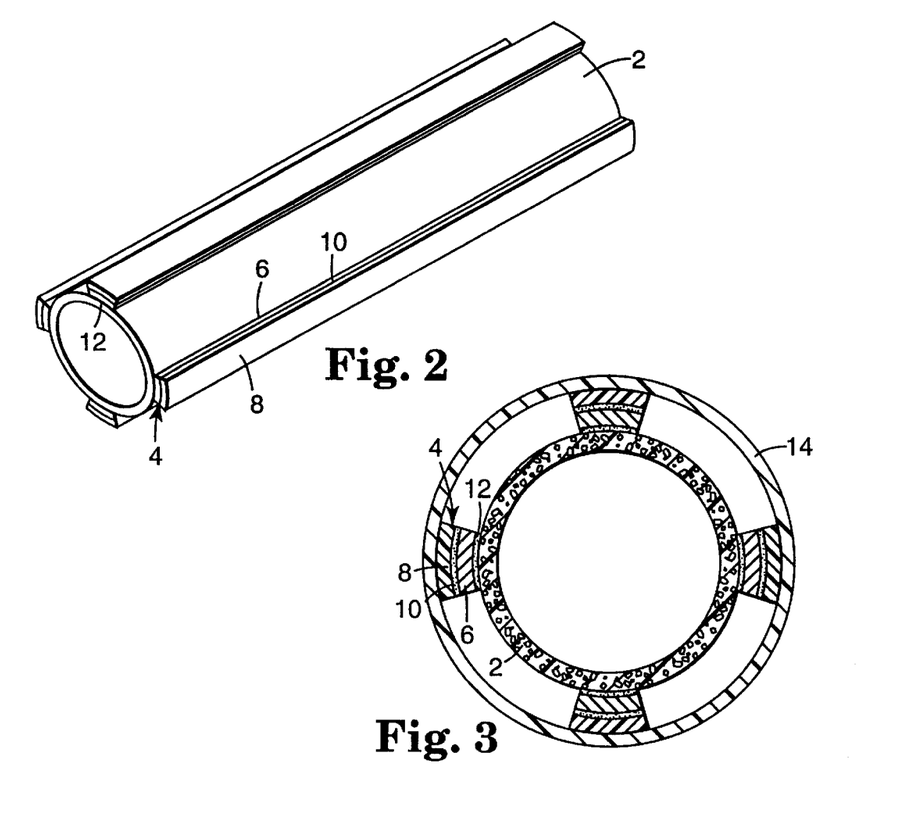
FIG. 2 illustrates a side view of the damper of FIG. 1.
FIG. 3 illustrates a cross-sectional view of the damper of FIG. 1 which is positioned in a hollow metal tube in such a manner that it will damp the metal tube.

FIG. 2 illustrates a side view of the damper of FIG. 1 and shows that the length of each damping section 4 is the same as the length of the shaft 2.

FIG. 3 illustrates a cross-sectional view of the damper of FIG. 1 which is positioned in a hollow tube (which may, for example, be metal) in such a manner that it will damp the tube 14. The constrained layer damping sections are attached to an interior surface of the tube via the vibration damping material layer of each constrained layer damper. This is possible due to the aforementioned pressure sensitive adhesive properties of the vibration damping material layers.

Figure 4:
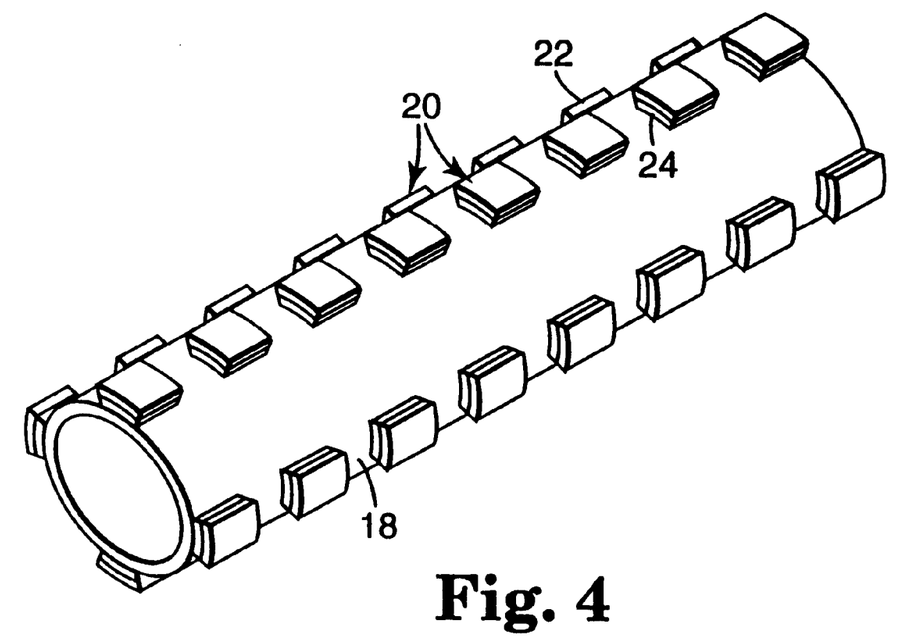
FIG. 4 illustrates a side view of another embodiment of the damper of the invention

FIG. 4 illustrates a side view of another embodiment of the damper of the invention. The damper comprises a hollow shaft 18 and multiple constrained layer damping sections 20 attached to the exterior surface of the shaft 18. Each constrained layer damping section 20 comprises a backing 24 and a vibration damping material layer 22. The backing 24 of each constrained layer damping section 20 is adhered to the elastic shaft 18 via an adhesive layer (not shown).

Figure 5:
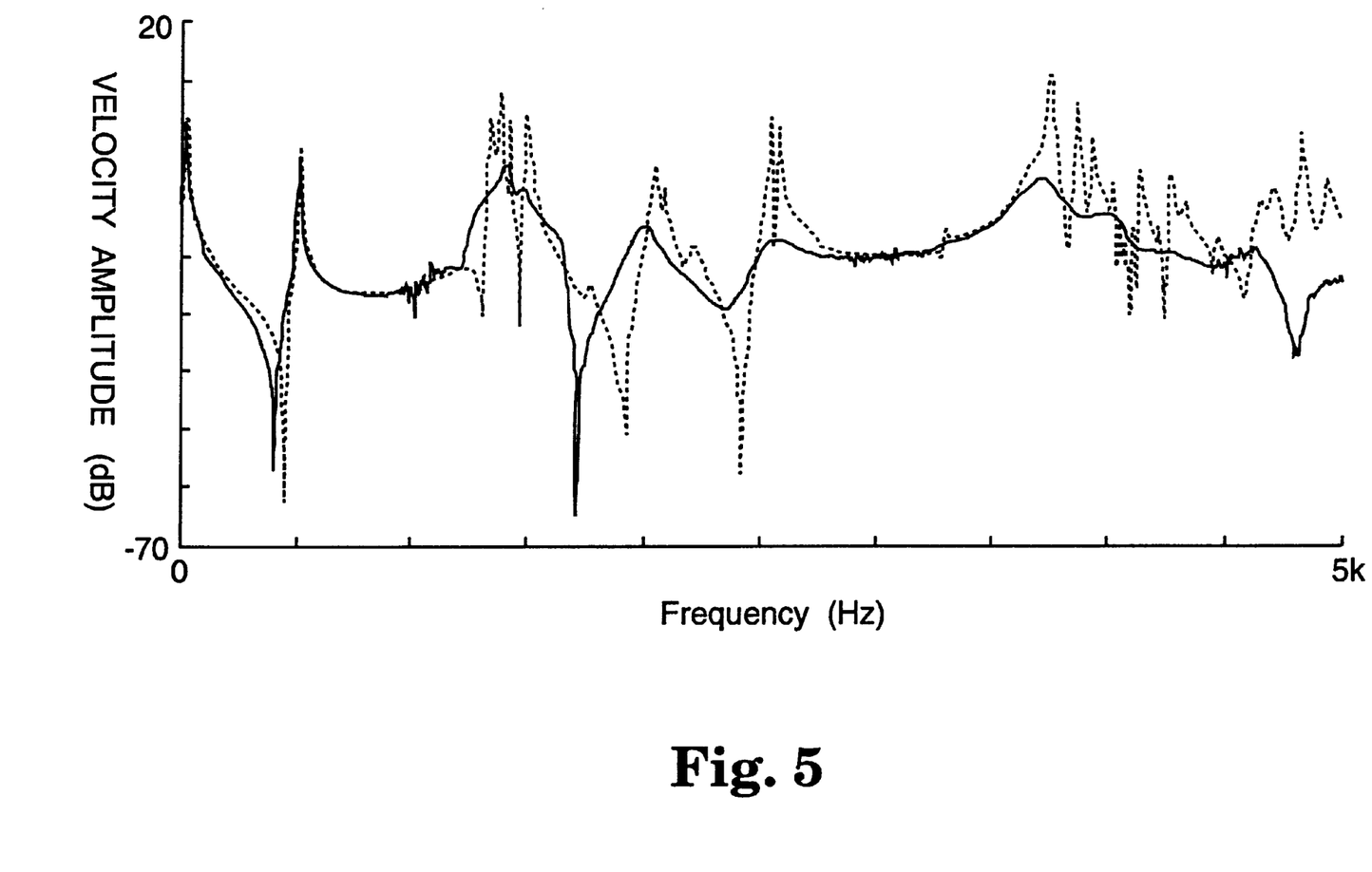
FIG. 5 illustrates the velocity response as a function of frequency for a tube having two dampers of Example 1 inserted therein (solid line) and for an identical tube having no dampers inserted therein (dashed line), upon vibrating.

FIG. 5 illustrates the velocity response as a function of frequency for a tube having two dampers of Example 1 inserted therein (solid line) and for an identical tube having no dampers inserted therein (dashed line), upon vibrating (see the Examples).

EXAMPLES

The present invention will be better understood by the following examples which are not meant to be limiting. All parts, percentages, ratios, etc., in the examples and elsewhere herein are by weight unless indicated otherwise.

Example 1

A damper of the invention was made as follows. A shaft was prepared from a 0.125 inches (3.175 mm) thick urethane foam with a length of 10 inches (25.4 cm) and a width of 5.5 inches (13.97 cm). The foam material was 3M SJ2503 high density vinyl foam, commercially available from 3M Company, St. Paul, Minn., which has pressure sensitive adhesive coated on one side. The foam was formed into a hollow cylindrical shaft with the adhesive on the outer surface. The two edges of the foam were bonded together by a pressure sensitive damping polymer (3M™ISD 112 acrylic damping polymer, commercially available from 3M Company, St. Paul, Minn.) to form a cylindrical hollow shaft with an outer diameter of about 1.88 inches (4.7 cm).

Four constrained layer damping sections were made with 0.060 inches (1.5 mm) thick steel as the backing layer and a 0.005 inches (0.127 mm) thick 3 M™ISD 112 acrylic damping polymer as the damping layer. The damping polymer layer had a paper release liner which was provided thereon. The constructions were made by laminating the damping polymer to the steel. The laminate was then cut into four constrained layer damping sections each having a length of 10 inches (25.4 cm) and a width of 0.188 inches (4.7 mm). The dampers were symmetrically attached to the outer surface of the shaft as in FIG. 1 by bonding the metal side of each constrained layer damping section to the foam shaft by the pressure sensitive adhesive that was on the shaft. This was done by applying 10–20 psi (69,000–138,000 Pascals) pressure on the side of the paper release liner on each constrained layer damping section. A rod inserted into the center of the shaft served to support the shaft as the constrained layer damping sections were adhered thereto.

Damping Test

The article tested was a cylindrical steel tube with a length of 32 inches (81 cm), a wall thickness of 0.065 inches (1.65 mm), an outer diameter of 2.187 inches (5.5 cm), and an inner diameter of 2.057 inches (5.2 cm), both with and without the dampers of the invention.

Two of the above described dampers of Example 1 were made and inserted into the steel tube one by one. Each damper was inserted into the tube by using a steel rod. The steel rod had a diameter of about 0.75 inches (1.9 cm) and a length of 35 inches (88.9 cm). Each damper was placed over the steel rod, after which the paper release liners were removed from the constrained layer damping sections. By using the steel rod as a guide, the first damper was inserted into the tube until it was about 1 inch (2.54 cm) away from the inserting end of the tube. The same procedure was applied for the second damper at the other end of the tube. This produced a damped tube having two dampers, one at either end of the tube. The damped tube was tested for its vibration response. The results were compared with that from an identical steel tube without dampers.

The damped tube was tested by using a PSV-200 Scanning Laser Doppler Vibrometer (from Polytec PI). The damped tube was suspended vertically by an elastic cord to simulate a free boundary condition. The vibration input was excited by a shaker, which was glued to the middle point on the outer surface of the damper tube. The response was measured by the Laser Doppler Vibrometer (LDV) at a point geometrically opposite to the excitation point. The LDV converts its instantaneous velocity along the beam line of sight into a corresponding velocity signal. The laser beam scans over the surface of the damped tube step by step. Both input and output signals were then transferred to a Tektronix 2630 FFT analyzer, which instantaneously displayed the frequency response function on the screen. The frequency response function provided the resulting velocity amplitude (relative to the forcing function) as a function of frequency. Each peak shown in the frequency response function (or curve) represents one resonant mode of vibration.

The same test procedure was carried out for an identical tube without the use of dampers, and the results were used for comparison with that from the damped tube. FIG. 5 shows the resulting velocity response as a function of frequency for the tube with and without dampers The solid line represents the resulting velocity amplitudes with the damped tube of the invention, and the dashed line denotes the results from the undamped tube. The peak near the zero-Hz frequency is essentially a rigid body mode (not a vibration mode), and should be disregarded. On the whole, there is a significant improvement in vibration response with the use of the dampers of the invention. The dampers worked well not only in the low frequency range (50–100 Hz) but also in the high frequency range (greater than 100 Hz).

The foregoing detailed description and examples have been given for clarity of understanding only. No unnecessary limitations are to be understood therefrom. The invention is not limited to the exact details shown and described, for variations obvious to one skilled in the art will be included within the invention defined by the claims.

It is claimed:

1. A damper comprising:
   (a) a compressible and resilient shaft, the shaft having an exterior surface and optionally an interior surface, wherein the shaft comprises a material selected from the group consisting of foam, rubber, and combination thereof;
   (b) at least one constrained layer damping section, each constrained layer damping section comprising:
      (i) a backing;
      (ii) a layer(s) of vibration damping material attached to one side of the backing;
      wherein the Young's modulus of the backing is greater than the Young's modulus of the layer(s) of vibration damping material;
      (iii) optionally a first adhesive layer, wherein the first adhesive layer serves to attach the layer(s) of vibration damping material to the backing; and
      (iv) optionally a second adhesive layer, wherein the second adhesive layer is coated on a side of the layer(s) of vibration damping material not attached to the backing; and
   (c) a third adhesive layer, wherein the third adhesive layer serves to attach the constrained layer damping section(s) to the exterior surface of the shaft via the backing of each constrained layer damping section.

2. The damper of claim 1 wherein the dimensions and positions of the constrained layer damping section(s) are such that the entire length of the damper is capable of being compressed such that its diameter decreases along its length.

3. The damper of claim 1 wherein the shaft comprises a material selected from the group consisting of acoustical absorbing materials.

4. The damper of claim 1 wherein the shaft has 1 to 50 constrained layer damping sections attached thereto.

5. The damper of claim 1 wherein the shaft has 2 to 10 constrained layer damping sections attached thereto.

6. The damper of claim 1 wherein each constrained layer damping section has a length which is about 20 to about 100 percent of the length of the shaft.

7. The damper of claim 1 wherein each constrained layer damping section has a length which is about 50 to about 100 percent of the length of the shaft.

8. The damper of claim 1 wherein each constrained layer damping section has a length which is about 75 to about 100 percent of the length of the shaft.

9. The damper of claim 1 wherein the constrained layer damping sections have shapes selected from the group consisting of rectangles and tapered rectangles.

10. The damper of claim 1 wherein the constrained layer damping sections are symmetrically positioned about the shaft.

11. The damper of claim 1 wherein the constrained layer damping sections are equidistantly positioned about the shaft.

12. The damper of claim 1 wherein each constrained layer damping section is independently positioned along or parallel to a shortest line segment connecting a point on one end of the shaft to a point on an opposite end of the shaft at a same degree point on a circumference of the shaft when the shaft is viewed in cross-section on an x-y grid, wherein each point on the shaft is capable of being identified as being on a degree point of 0 to 360 degrees.

13. The damper of claim 1 wherein the backing is selected from the group consisting of paper, metal, polymeric materials, fiber reinforced polymeric materials, and combinations thereof.

14. The damper of claim 13 wherein the polymeric materials are selected from the group consisting of polystyrene, polyester, polyvinyl chloride, epoxy resin, polyurethane, polycarbonate, polyimide, polyethylene, and polypropylene.

15. The damper of claim 1 wherein the backing has a Young's Modulus of at least about $1 \times 10^8$ Pascals.

16. The damper of claim 1 wherein the shaft has a cross-sectional shape selected from the group consisting of circular, rectangular, elliptical, triangular, star, and gear shapes.

17. The damper of claim 1 wherein the diameter of the shaft varies along its length.

18. The damper of claim 1 wherein the shaft is tapered along its length.

19. The damper of claim 1 wherein the total thickness of the vibration damping material layer(s) for each constrained layer damping section ranges from about 0.01 to about 3 mm.

20. The damper of claim 1 wherein the total thickness of the vibration damping material layer(s) for each constrained layer damping section ranges from about 0.05 to about 1 mm.

21. The damper of claim 1 wherein the total thickness of the vibration damping material layer(s) for each constrained layer damping section ranges from about 0.1 to about 0.25 mm.

22. The damper of claim 1 wherein the total thickness of the vibration damping material layer(s) for each constrained layer damping section is less than the thickness of the backing for each constrained layer damping section.

23. The damper of claim 1 wherein the backing for each constrained layer damping section has a Young's Modulus of at least about 10 times greater than that of the vibration damping material layer(s) for each constrained layer damping section.

24. The damper of claim 1 wherein the backing for each constrained layer damping section has a Young's Modulus of at least about 100 times greater than that of the vibration damping material layer(s) for each constrained layer damping section.

25. The damper of claim 1 wherein the backing for each constrained layer damping section has a Young's Modulus of at least about 1000 times greater than that of the vibration damping material layer(s) for each constrained layer damping section.

26. The damper of claim 1 wherein the backing for each constrained layer damping section has a thickness of greater than about 0.013 mm.

27. The damper of claim 1 wherein the backing for each constrained layer damping section has a thickness of greater than about 0.025 mm.

28. The damper of claim 1 wherein the backing for each constrained layer damping section has a thickness of greater than about 0.051 mm.

29. An article having at least one damper of claim 1 attached to an inner surface(s) thereof in a manner which damps the article.

30. The article of claim 29, wherein the article is selected from the group consisting of shafts, tubes, conduits, pipes, poles, posts, and columns.

31. The article of claim 29 wherein the article is selected from the group consisting of drive shafts, golf club shafts, light poles, basketball backboard poles, ball bats, structural columns, robot arms, and air duct lines.

32. An article having at least one damper of claim 1 attached to an inner surface(s) thereof such that each constrained layer damping section is attached to an inner surface(s) of the article.

* * * * *

UNITED STATES PATENT AND TRADEMARK OFFICE
CERTIFICATE OF CORRECTION

PATENT NO.: 5,902,656

DATED: May 11, 1999

INVENTOR(S): Shwi-Long Hwang

It is certified that error appears in the above-identified patent and that said Letters Patent is hereby corrected as shown below:

Title page,
Column 1, under "References Cited U.S. PATENT DOCUMENTS", the following reference should be added --5,725,931 3/10/98 Landin et al.--; and Column 11, line 6, "combination" should read --combinations--.

Signed and Sealed this

Fourteenth Day of December, 1999

Attest:

Q. TODD DICKINSON

Attesting Officer

Acting Commissioner of Patents and Trademarks